(12) United States Patent
Romeo

(10) Patent No.: US 7,635,496 B2
(45) Date of Patent: Dec. 22, 2009

(54) TOMATO PRODUCTS

(75) Inventor: Aurelio Romeo, Rome (IT)

(73) Assignee: Zanichelli Richerche S.R.I., Rome (IT)

( * ) Notice: Subject to any disclaimer, the term of this patent is extended or adjusted under 35 U.S.C. 154(b) by 0 days.

(21) Appl. No.: 10/524,014

(22) PCT Filed: Aug. 5, 2003

(86) PCT No.: PCT/EP03/08639

§ 371 (c)(1),
(2), (4) Date: Feb. 8, 2005

(87) PCT Pub. No.: WO2004/017759

PCT Pub. Date: Mar. 4, 2004

(65) Prior Publication Data

US 2006/0035002 A1 Feb. 16, 2006

(30) Foreign Application Priority Data

Aug. 8, 2002 (IT) .......................... MI2002A1801

(51) Int. Cl.
*A23L 1/212* (2006.01)
(52) U.S. Cl. ...................... 426/615; 426/628; 426/599; 426/589
(58) Field of Classification Search ................. 426/615, 426/628, 599, 590, 589
See application file for complete search history.

(56) References Cited

U.S. PATENT DOCUMENTS

| | | | | |
|---|---|---|---|---|
| 4,140,809 | A | * | 2/1979 | Glasser et al. ............... 426/589 |
| 5,965,190 | A | * | 10/1999 | Gallaher et al. ............. 426/615 |
| 2003/0224100 | A1 | * | 12/2003 | de la Cuadra et al. ....... 426/615 |
| 2004/0194634 | A1 | | 10/2004 | Succar et al. |

FOREIGN PATENT DOCUMENTS

EP 888718 A1 * 1/1999
WO WO 03/024243 A3 3/2003

OTHER PUBLICATIONS

The Benefits of Live Oil. http://www.radioislam.co.za/Hints%20&%20Remedies/The%20Benifits%20of%20Olive%20oil.htm. p. 1.*
Terrytx. Creamy Tomato Cheese Soup-report. Jan. 19, 1999. Cooking Club at Recipelink.com. http://www.recipelink.com/msgbrd/board_0/1999/JAN/36322.html. pp. 1-2.*
Tanglertpaibul et al. XP 002043494 Flow Properties of Tomato Concentrates: Effect of Serum Viscosity and Pulp Content. Journal of Food Science Voume 52, No. 2, 1987. pp. 318-321.*
C.S. Leoni, "I derivati industriali del pomodoro", Experimental Station for the food preserves industry in Parma, Italy; pp. 92-93 (Oct. 1993).
Sebastiano Porretta, "Il controllo della qualita dei derivati del pomodoro"; Experimental Station for the food preserves industry in Parma, Italy; pp. 50-51 (1991).
S.J. Kazeniac et al., Journal of Food Science, vol. 35, pp. 519-530 (1970).
Helga Gerster, Journal of the American College of Nutrition, vol. 16, No. 2, pp. 109-126 (1997).
Steven K. Clinton, Nutrition Reviews, vol. 56, No. 2, pp. 35-51 (1998).
G.R. Takeoka et al., J. Agric. Food Chem., vol. 49, pp. 3713-3717 (2001).
P.G. Goose et al., Food Trade Press Ltd., London, England; Sep. 1964.

* cited by examiner

*Primary Examiner*—Lien Tran
*Assistant Examiner*—Kelly Bekker
(74) *Attorney, Agent, or Firm*—Birch, Stewart, Kolasch & Birch LLP

(57) ABSTRACT

Tomato products obtained from tomato juice or tomato passata having the following composition in percentage by weight:
  dry residue 5.5-20%,
  water 94.5-80%,
100% being the sum of the two components,
wherein the amount of water-insoluble and water-soluble solids in the dry residue ranges in percentage by weight:
  Water-insoluble solids from 18% to 70%
  Water-soluble solids from 82% to 30%,
the sum of the two components being 100% of the dry residue.

34 Claims, 4 Drawing Sheets

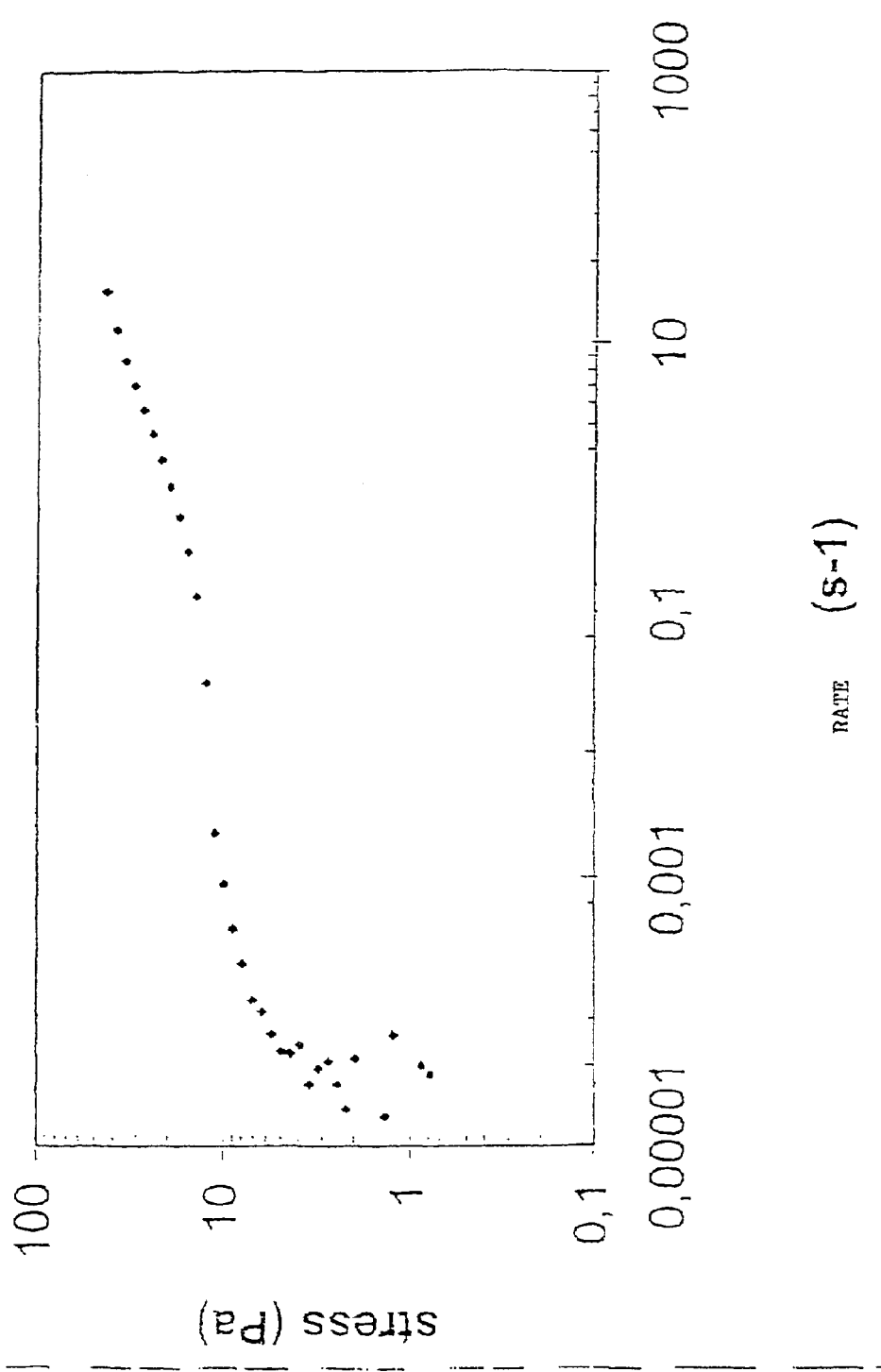

TOMATO PRODUCTS

BACKGROUND OF THE INVENTION

1. Field of the Invention

The present invention relates to novel tomato products having an improved saucing power in particular on pasta.

2. Description of the Related Prior Art

Tomato products, prepared from the tomato juice obtained by fruit trituration, seed and peel separation, are known in the prior art. The tomato juice is an aqueous suspension of insoluble solids in an aqueous solution wherein organic and inorganic substances are dissolved.

From the obtained juice other products such as tomato passatas and tomato concentrates can be obtained. Tomato passatas in general are obtained from juices by partial concentration. The tomato concentrates are obtained by stronger concentration processes. The methods generally used are the reverse osmosis, cryoconcentration and concentration by evaporation. By using the reverse osmosis it is not possible to operate at room temperature. Temperatures of about 70° C. are requested in order to have a satisfactory concentration yield; furthermore it is necessary to clean and regenerate the membranes by means of chemical detergents, which must then be removed. In fact said compounds are pollutant of the tomato products. See C. S. Leoni "I derivati industriali del pomodoro", experimental Station for the food preserves industry in Parma, October 1993, pages 92-93. The cryoconcentration is inapplicable to the tomato juice due to the high percentage of solids in suspension, which would be separated together with ice. See page 93 of the previous quotation.

In practice the concentration by evaporation remains the method of choice to concentrate the tomato juice. See page 93 of the previous reference. Concentration by evaporation implies juice heating; the duration of heating and the maximum temperature reached in the juice during the concentration step lead to organoleptic and nutritional variations of the product. The organoleptic variations are a caramel taste and a typical cooking ("cotto") aroma present in tomato concentrates and they are mainly due to the formation during juice concentration of hydrogen sulphide, dimethylsulphide, furfural, 3-methylmercaptopropanal, 2,4-heptadienal, acetaldehyde, phenylacetaldehyde. See S. Porretta "Il controllo della qualità dei derivati del pomodoro", experimental Station for the food preserves industry in Parma (1991), page 51; S. J. Kazeniac et al., J. Food Sci. 35 519 (1970).

The nutritional variations are mainly due to the degradation of the carotenoids present in the tomato and in particular of lycopene. The tomato as such and its products have a high nutritional value, deriving from the vitaminic components, and mainly from the contained carotenoids. It has been demonstrated that the tomato product consumption is associated to a risk decrease of some cancer types (prostata, pancreas, stomach). See H. Gerster, J. Am. Coll. Nutr. 1997, 16, 109-126; S. K. Clinton Nutr. Rev. 1998 56 35-51. The previously described beneficial nutritional effects are to be ascribed to the carotenoids contained in the tomato and in particular to lycopene. Recently it has been shown that during the concentration by evaporation of the tomato juice there is a degradation of carotenoids, lycopene too. See R. Gary et al., J. Agric. Food Chem. 2001 49 3713-3717.

It is also known that it is not feasible to filter the tomato products, in particular tomato juices and tomato passatas, since the filter is quite immediately occluded.

Most of the commercial tomato products must be diluted before use. The commercial tomato concentrates, for example in Italy, are classified as follows:

| | |
|---|---|
| semiconcentrate | dry residue 12% by weight; |
| concentrate (C) | dry residue 18% by weight; |
| double concentrate (DC) | dry residue 28% by weight; |
| triple concentrate (TC) | dry residue 36% by weight. |

Generally the concentrated products are diluted before and during the use. The saucing power of the triple concentrate (TC) as such, before dilution, is higher than that of the other commercial tomato products, concentrates included. By saucing power it is meant the product capability to stick to foods to which it is added, for instance pasta. However, as above mentioned, said concentrated products must be diluted before or during use because of their too strong and unpleasant taste. Consequently the advantage of the higher saucing power of said products is lost. Generally all the commercial tomato concentrates having a dry residue above 12% wt. show such taste problem and therefore must be diluted.

If a semiconcentrate at 12% dry residue is used, since it generally should not be diluted before use showing no problems of unpleasant taste, the saucing power is very low, even lower than the saucing power of TC as such. The tomato products known as tomato passatas are used as a ready base for quick sauce preparation. Generally in tomato passatas the dry residue, which can be determined as described afterwards, is lower than or equal to 10% by weight, generally comprised between 8%-10% by weight.

BRIEF SUMMARY OF THE INVENTION

The Applicant has surprisingly and unexpectedly found tomato products which do not need either dilution or concentration before their use, for instance on foods, said tomato products can also be used as such as foods, and have an improved saucing power, improved organoleptic properties, i.e. devoid of any caramel taste, bitter taste, cooking ("cotto") aroma, sour taste.

An object of the invention is a composition or a tomato product obtained from tomato juice or tomato passatas having the following composition in percentage by weight:

| | |
|---|---|
| dry residue | 5.5-20%, |
| water | 94.5-80%, |

100% being the sum of the two components, wherein the amount of water insoluble solids and water soluble solids in the dry residue range in percentage by weight as it follows:

water insoluble solids from 18% to 70%, water soluble solids from 82% to 30%.

Preferably the ranges of water insoluble solids and water soluble solids in the dry residue in percentage by weight are as it follows:

water insoluble solids: 20%-50%, water soluble solids 80%-50%.

Still more preferably the ranges of water insoluble solids and water soluble solids in the dry residue range in percentage by weight are the following:

water insoluble solids: 30% to 50%, water soluble solids 70%-50%.

The total dry residue, the water soluble solids and the water insoluble solids are determined as described in the Examples.

BRIEF DESCRIPTION OF THE DRAWINGS

The present invention will become more fully understood from the detailed description hereinbelow and from the drawings that accompany this application. These drawings should not be construed as limiting the invention in any way.

FIG. 4 shows rheological properties (shear stress/speed gradient ($s^{-1}$)) of triple concentrate (TC) and of pulped tomatoes.

FIGS. 1-4 are graphical illustrations of the data set forth in Tables 1-7.

DETAILED DESCRIPTION OF THE INVENTION

Figure 1:
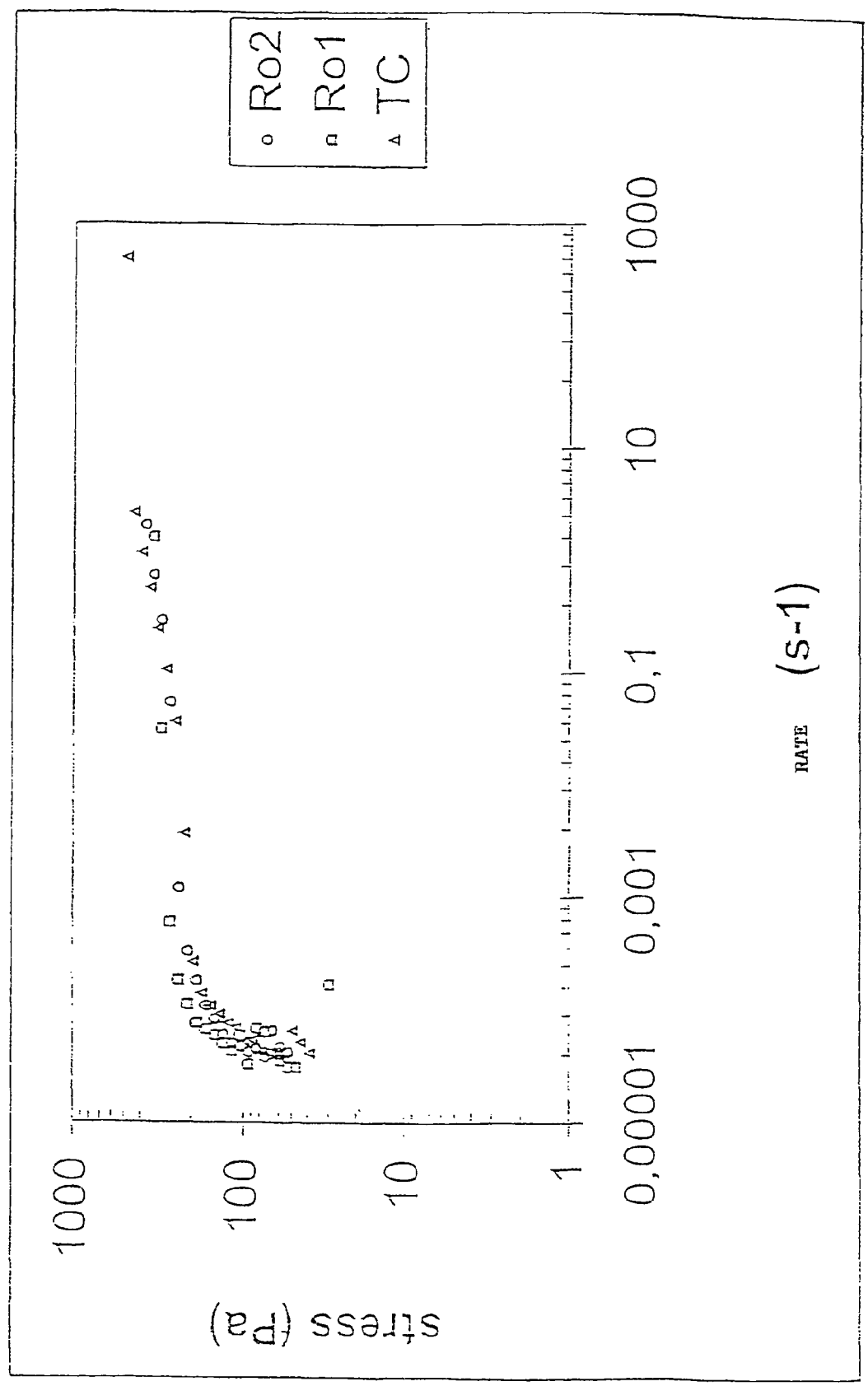
FIG. 1 shows rheological properties (shear stress/speed gradient ($s^{-1}$)) of triple concentrate (TC), of product Ro2 (example 1) and of product Ro1 (example 2).

The tomato products of the invention are obtainable by the process described below that, differently from the products of the prior art, includes a more thorough separation of the tomato serum from the water insoluble solids, that affords to obtain tomato products according to the invention, having a water insoluble solid content in the dry residue even up to 70%.

To the invention tomato products it is possible to add lyophilized or cryoconcentrated serum, or serum concentrated by osmosis membrane or by evaporation under vacuum, to further improve or varying the taste. It is thus possible to obtain, for example, tomato products having a lower content of water insoluble solids in the dry residue.

Therefore in the invention tomato products it is possible to adjust the ratio between the water insoluble solids and those water soluble. The Applicant has found that by varying the amount of water soluble solids in the total solids of the composition the taste properties of the product (more or less intense tomato taste), can be suitably dosed. The olfactory properties of the product (fresh tomato smell), since the water insoluble solids retain the volatile components, mainly depend from the amount of water insoluble solids in the total solids.

Furthermore the Applicant has found that the invention tomato products can unexpectedly incorporate, for example, by mechanical mixing, without showing any serum separation, animal and vegetable fats solid at room temperature, such for example butter or margarine, and/or fats liquid at room temperature as for example vegetable oils, for example olive oil, and/or cheese having soft- or fresh-grain or hard-grain and grated.

The starting tomato product used to prepare said mixed products should preferably have a water insoluble solid content and water soluble solid content in the dry residue in the following ranges as percentages by weight:
water insoluble solids from 30% to 70%,
water soluble solids from 70% to 30%;

still more preferably;
water insoluble solids from 35% to 70%,
water soluble solids from 65% to 30%.

The amount of fats and/or oil which can be incorporated in the composition ranges from 10 to 25% by weight referred to the weight of the starting tomato product; soft-grain cheese can be instead incorporated in any desired amount, since the two components (soft-grain cheese and tomato product) are perfectly miscible in all weight ratios; the amounts of soft-grain cheese which can be incorporated are for example from 50% to 300% by weight referred to the weight of the starting tomato product.

When food fats that are solid at room temperature are used, it is preferable to heat preliminary said fats, before mixing with the tomato product of the invention, at least up to their softening point but preferably not above their melting point.

The amount of hard-grain and grated cheeses which can be incorporated ranges from 10 to 25%. Said compositions can be used as ready-to-use sauce for foods since they incorporate, as said above, oil, butter and/or cheeses. To said compositions other usual ingredients of food products, such for example essence aromas, preservatives, etc, can be added.

As said, the invention tomato products and the compositions obtained therefrom as above defined have an improved saucing power and improved organoleptic and nutritional properties in comparison with the products on the market.

The invention products, in particular those obtainable by mixing the invention tomato products with fats and/or oils and/or cheeses, can also be used as such as foods. For example said products can be spread on bread, as it is made for soft cheese.

Said saucing power is combined with improved organoleptic properties, i.e. without a caramel, or a bitter, or a sour taste. Said organoleptic properties are instead completely absent in the commercial products showing a good saucing power. See the comparative Examples on the commercial products TC, DC and C.

The Applicant has found that the amount of water insoluble solids which must be present in the tomato product to confer an improved saucing power must be at least 18% weight with respect to the dry residue of the tomato product, preferably from 20% to 50% weight.

As foods on which to use the tomato products of the invention, pasta, meat, fish, vegetables, etc., can be mentioned.

A test to determine the saucing power is described in the Examples.

The invention products show a high content of water insoluble solids. The Applicant has found that the amount of water insoluble solids in the commercial products is not higher than 15% in the dry residue. For example in the fresh pulp the amount of water insoluble solids is generally about 12.5% of the total tomato solids (dry residue). See in "Tomato paste, Purée, Juice & Powder" P. G. Goose, Food Trade Press Ltd 1964, page 69.

The tomato compositions of the invention, as said, have an improved saucing power. As it is known, the final step for preparing in home kitchens a sauce starting from fresh tomato or from a tomato product, comprises heating with fats or oils and other aromas until obtaining a sauce endowed with satisfactory saucing power. The tomato compositions of the invention show a further advantage, with respect to the known tomato sauces, that they do not need a prior heating step before use. In this way the detrimental effect of the temperature during the preparation of the tomato-based sauces is avoided. In fact in said heating step lycopene is solubilized by fats, and in this way this compound is easily degraded by the concomitant effect of light and oxygen in the hot conditions of cooking.

The process for obtaining the tomato compositions of the invention is described herein below. It has been found, unexpectedly and surprisingly, that by using filtration but maintaining under a slow stirring the tomato suspension to be filtered, it is possible to filter the starting tomato suspensions, since the tomato mass in such conditions detaches from the filter the sediments that constitute the impermeable layer depositing on the filter surface, and incorporates them. In fact, as said, it is known that it is not feasible the filtering of the tomato products, in particular tomato juices and tomato passatas, since the filter is quickly occluded by an highly impermeable layer. The filtration process according to the present invention proceeds instead rapidly. It is ended when substantially there is no more serum separation. A compact mass is formed by filtration that can be easily recovered, since it does not stick to the filter.

It is therefore a further object of the present invention a process for the separation of the liquid (tomato juice serum) from a tomato suspension by using a separation solid-liquid apparatus wherein the mass or suspension to be filtered is maintained under slow stirring, at an angular speed generally from 1 rpm to 20 rpm, preferably from 2 rpm to 10 rpm, preferably the stirrer being of a shape to convey the suspension toward the central axis of the apparatus, or there is not a stirrer and it is the apparatus that rotates. In the alternative, the apparatus used for separating the liquid from a tomato suspension is a sieve maintained under a motion such as for example under an oscillating motion, or preferably under a nutational motion, the oscillations per minute being generally from 1 to 20 oscillations/min, preferably from 2 to 10 oscillations/min.

The process of the invention is preferably carried out under sterile conditions; in the alternative the final tomato product can undergo a sterilization process.

In said case sterilization can be performed with conventional methods, preferably by operating under mild temperature conditions, preferably under high pressures, for example comprised between 5,000-7,000 Atm.

The invention process is carried out by operating at temperatures generally in the range 5° C.-25° C., preferably 10° C.-15° C., at atmospheric pressure, or using pressures slightly higher than that atmospheric, from 760 mm Hg (0.101 MPa) up to 900 mm Hg (0.120 MPa) or by applying pressures slightly lower than the atmospheric pressure, down to 450 mm Hg (0.06 MPa). As said above, if the process of the present invention is not operated under sterile conditions, the recovered tomato product at the end of the process is subjected to sterilization processes.

The process for obtaining the invention tomato products can be performed in a separation solid liquid apparatus constituted for instance of a vessel made for instance of food grade stainless steel, having walls with openings or slots formed for instance with woven wire cloth, or with screens such as for instance wire screens or welding screens, or instead said walls have holes such as for instance fine punched holes or drilled holes or slot milled holes or beam perforated holes (laser perforation or electron beam perforation), being the width of the openings of slots, or the diameter in the case of holes, not greater than 0.1 mm and preferably not lower than 0.02 mm. The slots length is not critical. For example said length can range from 30 cm to 2 meters, depending on the volume of the tomato juice to be treated. When the separation solid liquid apparatus has a bottom wall, this is preferably made of a plate without slots or holes.

Preferably the separator has a cylindrical section.

The separator is furthermore equipped with a device for mechanical stirring. Stirring must be very slow, the angular speed is generally from 1 rpm to 20 rpm, preferably from 2 rpm to 10 rpm, the device being of a shape such that the solid is conveyed in the separator central zone (with reference to the longitudinal axis). It has been found that said stirring prevents the solid from adhering and accumulating on the separator walls, so that no impermeable layer formation occurs in the separator during the processing.

The distance between the separator walls and the stirrer blades is from 0.5 to 2 cm.

According to the present invention process the separator is charged with the tomato juice, obtained for example by tomato fruit trituration and seed and peel separation, or charged with tomato passatas, obtained for example as the tomato juice but operating at lower temperature during the centrifugation step. The tomato juices have been previously treated according to known processes, for example by "hot break", "cold break" processes, or by applying high pressures, for example of the order of 5,000-7,000 Atm ($5.06 \times 10^2$ MPa-$7.09 \times 10^2$ MPa), to inactivate enzymes.

The tomato mass to be filtered can optionally be protected during the process by operating in an atmosphere of an inert gas, e.g. nitrogen. In this way it is avoided the contact of the tomato mass with oxygen in the presence of the light. This optional step is requested in case the temperature, for unforeseen events, during the process results higher than 25° C. By operating in this way no lycopene losses occur.

The process ends when in the separator there is a compact mass which does not separate any longer tomato juice serum.

By operating with the separation process according to the present invention carotenoids, lycopene comprised, remain in the mass which separated from the liquid part or tomato serum.

Unexpectedly and surprisingly with the invention process there is no clogging of the separator walls having openings or holes of the above said sizes since unexpectedly and surprisingly a compact mass is formed, as said above. Said result is unforeseen since one would expect the formation of a product layer adhering to the walls, substantially impermeable.

Said mass, formed during the invention process, is compact and does not adhere to the walls whereby it is easily recovered from the separator. The invention process has a very high productivity since there are no clogging on the walls with consequent process downtime for the separator cleaning.

The tomato juice serum percolated from the separator walls, containing a large part of the soluble solids of tomato juice, is generally recovered by lyophilization or cold concentration with known methods, for example cryoconcentration.

Another method to obtain the invention tomato products is to use a concave- or flat-shaped sieve, having holes diameter or slots width not greater than 0.1 mm, preferably not lower than 0.02 mm, wherein it is transferred the starting tomato juice, obtained as above. The juice into the sieve is kept under an oscillatory motion until a compact mass, as above said, is formed, which does not separate any longer the serum.

The compact mass is easily recovered since it does not adhere to the sieve.

The temperature conditions are those indicated above for the process using a separator; preferably atmospheric pressure is used.

The number of oscillations/minutes are those herein above reported.

A further process used to obtain the invention tomato products consists in charging the tomato juice, treated as above, on a cylinder constituted by food grade stainless steel wherein the walls have openings or slots formed for instance with woven wire cloth, or with screens such as for instance wire screens or welding screens, or instead said walls have holes such as for instance fine punched holes or drilled holes or slot milled holes or beam perforated holes (laser perforation or electron beam perforation), being the width of the openings of slots, or the diameter in the case of holes, not greater than 0.1 mm and preferably not lower than 0.02 mm. Said cylinder has inside a stirrer in the form of an archimedean screw revolving free in the fixed cylinder, or consists simply of a rotating tube wound helically about a cylindrical axis. Rotation of the moving part must be very slow, generally at an angular speed of 2-10 rpm. The process is preferably carried out under the temperature and pressure operating conditions above described for the process in which a separator is used.

Preferably the cylinder is in an horizontal position, and has a diameter which can for example range from 30 cm and 1 meter, length from 2 meters to 20 meters. Preferably from 2 meters to 5 meters for apparatus working in a discontinues way. Preferably about 20 meters for apparatuses working in a continuous way.

For discontinuous apparatuses the juice is let pass in the cylinder, with several recycling steps, until a compact mass is formed and there is no separation of tomato serum any longer.

When treating tomato suspensions obtained from partially ripened tomatoes, the slots width and the holes diameter of the separation liquid solid apparatus can reach also values not higher than 0.5 mm, preferably about 0.3 mm.

The apparatus for obtaining the tomato products of the present invention, comprising the filtering nets, can be of plastic material or of metal, steel included. Preferably the apparatus is made of food grade inox steel. When a plastic material is used, it can be cited propylene homopolymers or copolymers, ethylene homopolymers or copolymers, etc.

The serum is recovered as above indicated.

As said, the separated serum contains a great part of the water soluble solids contained in the tomato juice. The Applicant has found that the organoleptic properties (taste) of the invention tomato products can be modified by adding water soluble solids from lyophilized or concentrated serum. Generally serum is cold concentrated by cryoconcentration, or can be treated with the other described methods.

With the above processes tomato products are obtained according to the invention having a content of water insoluble solids in the dry residue even up to 70%.

Generally, with the invention process are obtained tomato products having a content of water insoluble solids and of water soluble solids in the dry residue in the following ranges:
 water insoluble solids: 30%-70%,
 water soluble solids: 70%-30%.

To said tomato products it is possible to add lyophilized, or cryoconcentrated serum, or concentrated as described, to further improve the taste. It is thus possible to obtain, for example, tomato products having a lower content of water insoluble solids in the dry residue, generally comprised between 18 and 30%.

The tomato products according to the present invention allow to maintain the organoleptic and nutritional properties of the fresh tomato. Therefore in the present invention products there are no variations of the organoleptic properties, such for example it happens in the tomato products of the prior art wherein it is noticeable, for instance, a caramel taste and/or a cooking ("cotto") smell.

Also the nutritional properties remain unaltered, since there is no alteration of the carotenoids, in particular of the lycopene, as it occurs in the commercial products.

The tomato compositions of the present invention can have a tomato taste that could result, depending on the water soluble/insoluble solids of the composition, more or less strong than the tomato sauces available on the market. The point to be stressed is that the taste of the commercial tomato sauces depends on the variety of tomatoes used and on their ripeness. Unexpectedly with the process invention it is possible to have tomato sauces having a constant taste from one production batch to another. This is a remarkable result from a commercial point of view. The Applicant has found that this taste variation depends on the ratio between soluble and insoluble compounds present in the tomato compositions. The present invention makes also possible to produce tomato products which more favourably meet the personal consumer's taste, since the ratio water soluble/insoluble solids, as said, can be therein varied.

The following not limiting Examples illustrate the invention.

EXAMPLES

Characterization Methods

Determination of the Saucing Power of a Tomato Product According to the Invention
 Materials:
 tomato product to be tested,
 vegetable oil, preferably olive oil,
 full length, not broken spaghetti No. 12 De Cecco trade mark with cooking time indicated by the manufacturer 12 minutes,
 sea salt.
 90 g of tomato product to be tested and 10 g of vegetable oil (condiment total weight: 100 g) are introduced into a vessel, preferably a plastic vessel, previously weighed and having 1 liter capacity.

70 g of spaghetti are cooked apart, in 1 liter of water containing 5 g of sea salt, for the time indicated on the package. At the end the cooked spaghetti are strained until no drops form any longer.

The cooked spaghetti are added to the condiment previously prepared in the plastic vessel and by a fork they are carefully mixed slowly for 5 minutes. The vessel is then put on a boiling water bain-marie for 5 minutes, without mixing spaghetti. From the vessel with a fork the spaghetti are taken in a number of 2-3 at a time and without shaking them, it is let fall in the vessel the condiment which tends to immediately detach.

In the plastic vessel it remains the condiment which has not adhered to the spaghetti. Lastly the plastic vessel is weighed and in this way it is determined the condiment weight which has not adhered to the pasta. The difference to 100 (initial condiment weight) gives the amount which has remained attached to the pasta ($Q_A$).

The saucing power is defined on the basis of the following equation:

$$\text{Saucing power} = \frac{Q_A \times 10}{100}$$

Determination of the Dry Residue: Total Solids

The total dry residue is determined in the tomato juice using a vacuum stove as described in Journal Officiel des Communitées Européenes 7.6.86 L. 153 pages 5-6.

Determination of Water Soluble Solids

The determination of water soluble solids has been carried out using a refractometer (Brix degrees), with the method based on Journal Officiel des Communitées Européenes 7.6.86 L. 153 pages 6-9.

Determination of Water Insoluble Solids

The determination of water insoluble solids has been carried out by calculating the weight difference between the dry residue and that of the water soluble solids (Brix value), as reported in "Tomato Production, Processing and Technology 3rd Ed." by W. A. Gould, CTI Publications, Inc., 1992 page 317.

Determination of the Rheometric Properties

In a Dynamic stress Rheometer SR-200 (Rheometric Scientific) the shear stress (Pa) with respect to the speed gradient ($s^{-1}$) has been measured.

Example 1

Preparation of a Tomato Product (Ro2 Code)

The processing is carried out under sterile conditions.

Kg of tomato juice (free from seeds and peels), previously hot break to inactivate enzymes, are portionwise transferred in a 10 liter separator equipped with stirrer. The separator is constituted by food grade stainless steel wherein the walls are constituted by woven wire cloth having a hole diameter of 0.5 mm, the bottom wall of the separator does not have slots or holes. The stirring in the separator is such that the solid is conveyed towards the central zone of the separator. The distance between the separator walls and the stirrer blades is of 0.5 cm. The stirring (3 rpm) is started and it is operated at a temperature in the range 5° C.-10° C.

After 3 hours stirring speed is reduced to 2 rpm. It is noticed that the mass in the separator has become compact and homogeneous. After 7 hours from the process beginning, no serum is any longer separated from the mass in the separator. Stirring is interrupted and the obtained product is discharged. 2.7 kg of tomato product Ro2 are recovered.

The product analysis is the following:
dry residue: 10% by weight;
water: 90%;
water soluble solids: 50% by weight with respect to the dry residue.
water insoluble solids: 50% by weight with respect to the dry residue.

The rheological properties of the product Ro2 have been measured in comparison with the following commercial products: triple concentrate (TC), double concentrate (DC), concentrate (C), tomato passatas.

Figure 2:
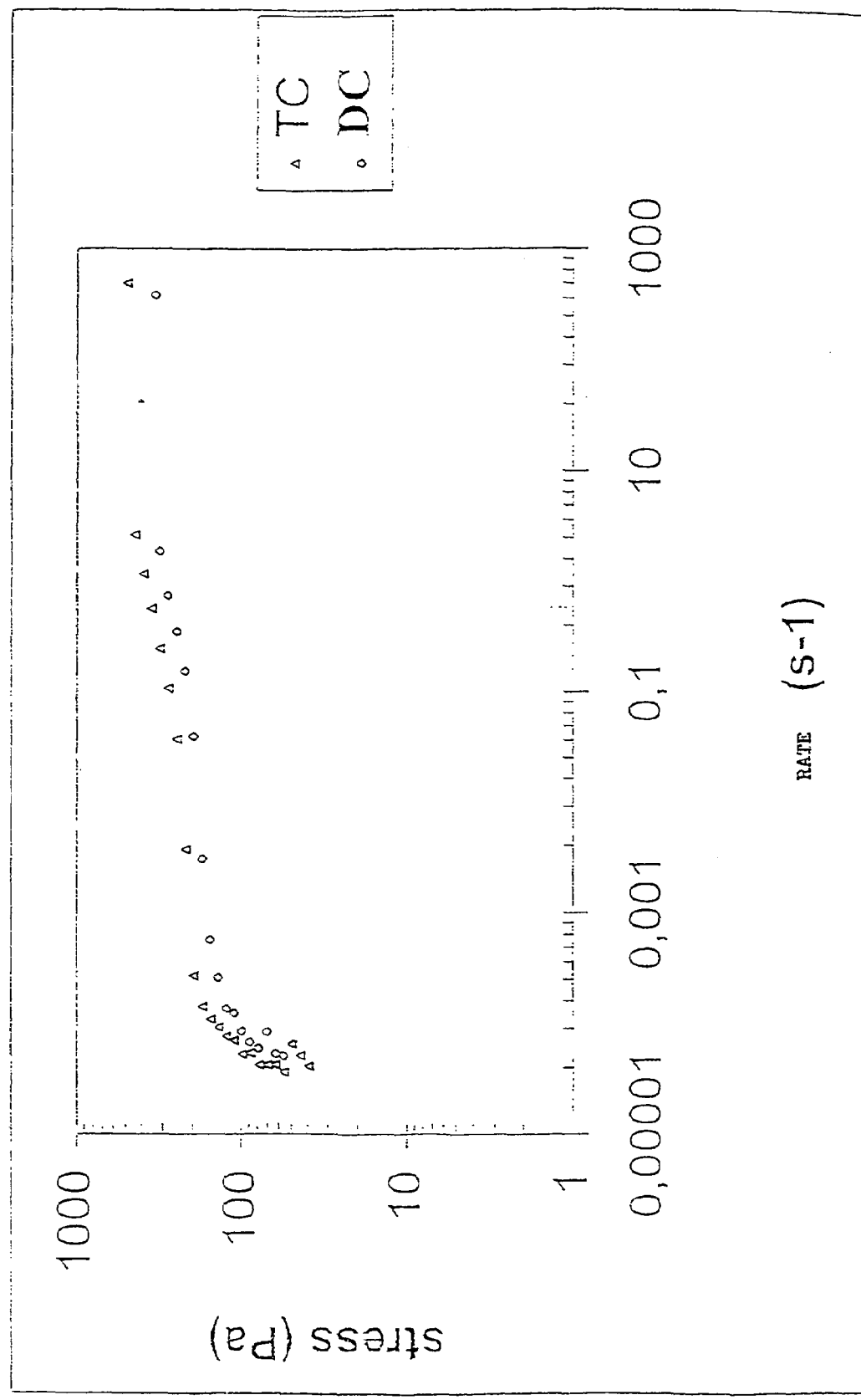
FIG. 2 shows rheological properties (shear stress/speed gradient ($s^{-1}$)) of triple concentrate (TC) and of double concentrate (DC).
Figure 3:
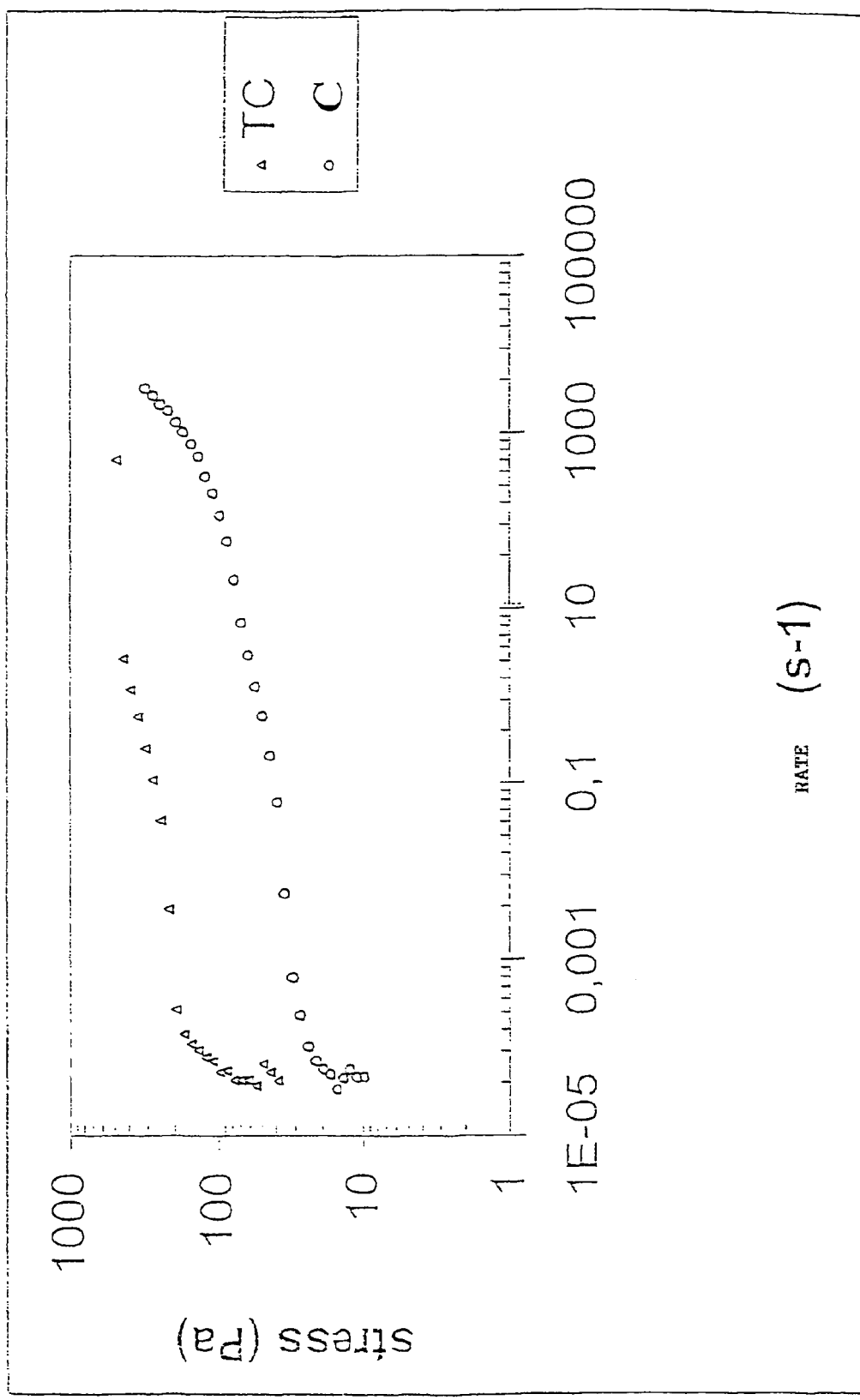
FIG. 3 shows rheological properties (shear stress/speed gradient ($s^{-1}$)) of triple concentrate (TC) and of concentrate (C)

The shear stress/speed gradient ($s^{-1}$) trend is reported in the following figures and the respective data in the Tables as indicated hereinunder:

Ro2, TC: FIG. 1 and Tables 1 (Ro2) and 3 (TC);
TC, DC: FIG. 2 and Tables 4 (DC) and 3 (TC);
TC, C: FIG. 3 and Tables 5 (C) and 3 (TC);
Tomato passatas: FIG. 4 and Table 6.

The Figures show that Ro2 has rheological properties that overlap to those of TC and are superior to those, respectively, of DC, C and tomato passatas.

Example 2

Preparation of a Tomato Product (Ro1) by Adding to the Product Ro2 Lyophilized Tomato Serum 980 g of the product Ro2, to which 20 g of lyophilized tomato serum are then added, are transferred into a vessel equipped with stirrer, in a sterile environment. It is stirred at 8 rpm at a temperature in the range 5° C.-10° C., until a homogeneous mass is obtained (product Ro1).

It is found that Ro1 has a dry residue of 11.8% by weight, water 88.2%, the water soluble solids are 58.5% and the water insoluble solids are 41.5% of the dry residue.

The rheological properties (shear stress/speed gradient ($s^{-1}$) trend) of the product Ro1 have been measured and compared with the same commercial products used for obtaining Ro2.

The Ro1 trend is reported in FIG. 1 and the data with which the rheogram has been plotted are reported in Table 2.

It can be repeated the same conclusions above mentioned for Ro2.

Example 3

Preparation of Compositions of the Invention Tomato Products with Vegetable Oil

A composition of tomato product Ro1 and olive oil was prepared. In a vessel, under stirring at 200 rpm, olive oil was slowly added, at small portions, to the product Ro1, leaving the mass under stirring for 5 minutes. The englobed oil amount is 15% by weight. The product was recovered and let stand one month at +4° C., in a closed vessel, without showing substantial oil separation.

Example 4

Preparation of Compositions of the Invention Tomato Products with Vegetable Oil

The Example 3 was repeated but adding all at once, slowly, to Ro1 an oil amount equal to 15% by weight with respect to the Ro1 weight. After leaving the mass under stirring for further 5 minutes from the end of the addition, the product was recovered. The same results of the Example 3 are obtained.

Example 5

Preparation of Composition of the Invention Tomato Product Ro2 with Food Fat Solid at Room Temperature The Example 3 was repeated but using a solid fat (butter), previously heated at 40° C. and then mixed with the tomato product Ro2 for 5 minutes (200 rpm) after the butter addition. The total added butter corresponds to 20% by weight of Ro1. After cooling a solid mass was obtained, from which serum does not separate, even after 20 days of storage in refrigerator at 5° C.

Example 6

Preparation of a Composition of the Invention Tomato Products Ro1 with Food Fat Solid at Room Temperature Example 5 was repeated but adding a total amount of butter of 300% by weight with respect to the tomato product Ro1, leaving then under stirring (200 rpm) for 15 minutes after the addition to homogenize the mass. After cooling a solid mass was obtained, from which serum does not separate, even after 40 days of storage in a refrigerator at 5° C.

Example 7

Preparation of a Composition of Ro1 with Soft-Grain Cheese

In a vessel, under stirring (200 rpm), to the product Ro1 different amounts of Philadelphia® Light cheese have been added. It has been found that this soft cheese is miscible in all the ratios with the product Ro1. In particular compositions having the following weight ratios Ro1/cheese: 50/50, 75/25, 25/75 have been prepared.

Example 8

Preparation of a Composition of Ro2 with Hard-Grain, Grated Cheese and a Food Fat Solid at Room Temperature In a vessel, under stirring (200 rpm), to 30 g of tomato product Ro2, 30 g of butter heated to 40° C. and 30 g of grated Parmesan cheese have been added. After 15 minutes of stirring the mass becomes homogeneous. At this point it is cooled to room temperature. A solid mass is obtained from which serum does not separate, even after 20 days of storage in a refrigerator at the temperature of 5° C.

Example 9

Preparation of a Composition of Ro1 with Soft-Grain Cheese

In a vessel, under stirring (200 rpm), to the product Ro1 different amounts of Jocca® cheese have been added. It has been found that this soft cheese is miscible in all ratios, as that used in the Example 7, with the product Ro1. Compositions having the same weight ratios Ro1/cheese as those of the Example 7: 50/50, 75/25, 25/75, have been prepared.

Example 10

Evaluation of the Saucing Power of the Invention Tomato Products in Comparison with Commercial Products The method indicated in the characterization methods for the determination of the saucing power has been used, for the invention products Ro1 and Ro2 and the comparative commercial products triple tomato concentrate (TC), double concentrate (DC), concentrate (C) and tomato passatas.

The results are reported in Table 7. The data show that Ro2 shows the best combination of saucing power and of organoleptic properties (taste). In any case the invention products show an improved saucing power combined with improved organoleptic properties with respect to the commercial tomato products.

TABLE 1

RO 2 test 1

| Stress Pa | Eta Pa-s | Rate s-1 | Torque N-m | times | Temp ° C. | Strain(t) % | SS Times | SS Slope | theta rad | G' Pa | G" Pa | Position | stress(t) Pa |
|---|---|---|---|---|---|---|---|---|---|---|---|---|---|
| 20.0000 | 1.46E+05 | 2.05E−04 | 5.03E−04 | 0 | 21.8 | 2.20E−01 | 30.0001 | 0.33468 | 0.22E−05 | 13184.1 | 0.00E+00 | 7 | 20.0000 |
| 33.0594 | 1.39E+06 | 2.42E−05 | 5.64E−04 | 20 | 21.8 | 4.14E−02 | 30.0001 | 0.03203 | 1.60E−05 | 01360.2 | 0.00E+00 | 7 | 33.0594 |
| 37.7664 | DIV0 | 0 | 6.33E−04 | 50 | 21.8 | 0.00E+00 | 30.0001 | 0 | 0 | | 0.00E+00 | 7 | 37.7664 |
| 42.3740 | 1.24E+06 | 3.41E−05 | 7.10E−04 | 00 | 21.8 | 0.21E−02 | 30.0001 | 0.04133 | 2.51E−05 | 80204.3 | 0.00E+00 | 7 | 42.3740 |
| 47.5451 | 1.43E+08 | 3.33E−05 | 7.07E−04 | 120 | 21.8 | 6.17E−02 | 30.0001 | 0.04017 | 2.00E−05 | 01039.6 | 0.00E+00 | 7 | 47.5451 |
| 53.3465 | 1.28E+08 | 4.10E−05 | 0.94E−04 | 150 | 21.8 | 6.21E−02 | 30.0001 | 0.0527 | 2.51E−05 | 85964.9 | 0.00E+00 | 7 | 53.3465 |
| 50.0557 | 1.28E+08 | 4.60E−05 | 0.001 | 180 | 21.8 | 6.21E−02 | 30.0001 | 0.06300 | 2.61E−05 | 96454.2 | 0.00E+00 | 7 | 50.0557 |
| 67.1592 | 1.02E+08 | 6.55E−05 | 0.00113 | 210 | 21.8 | 7.24E−02 | 30.0001 | 0.08091 | 2.93E−05 | 02762.8 | 0.00E+00 | 7 | 67.1592 |
| 75.3539 | 1.08E+08 | 3.80E−05 | 0.00126 | 240 | 21.8 | 1.14E−01 | 30.0001 | 0.0806 | 4.61E−05 | 66233.0 | 0.00E+00 | 7 | 75.3539 |
| 84.6405 | 1.08E+06 | 4.49E−05 | 0.00142 | 271 | 21.8 | 1.03E−01 | 30.0001 | 0.07438 | 4.19E−05 | 01747.1 | 0.00E+00 | 7 | 84.6405 |
| 94.865 | 2.26E+08 | 4.20E−05 | 0.00159 | 301 | 21.8 | 1.45E−01 | 30.0001 | 0.00772 | 5.86E−05 | 85615.5 | 0.00E+00 | 7 | 94.865 |
| 106.44 | 2.25E+08 | 4.73E−05 | 0.00178 | 331 | 21.8 | 1.97E−01 | 30.0001 | 0.01428 | 7.08E−05 | 54165 | 0.00E+00 | 7 | 106.44 |
| 119.420 | 2.40E+08 | 4.08E−05 | 0.002 | 360 | 21.8 | 2.38E−01 | 30.0001 | 0.01102 | 9.03E−05 | 50204.7 | 0.00E+00 | 7 | 110.420 |
| 134 | 2.23E+06 | 8.02E−06 | 0.00225 | 300 | 21.8 | 3.00E−01 | 30.0001 | 0.00914 | 1.21E−04 | 44678 | 0.00E+00 | 7 | 134 |
| 160.351 | 1.01E+06 | 8.33E−05 | 0.00252 | 421 | 21.8 | 4.03E−01 | 30.0001 | 0.01243 | 1.63E−04 | 37274.1 | 0.00E+00 | 7 | 160.351 |
| 160.690 | 1.55E+06 | 1.09E−04 | 0.00283 | 451 | 21.8 | 6.79E−01 | 30.0001 | 0.01107 | 2.35E−04 | 20126.2 | 0.00E+00 | 7 | 160.690 |
| 109.20 | 1.04E+06 | 1.03E−04 | 0.00317 | 401 | 21.8 | 9.31E−01 | 30.0001 | 0.04403 | 3.77E−04 | 20334.3 | 0.00E+00 | 7 | 109.20 |
| 212.376 | 6.37E+05 | 3.34E−04 | 0.00356 | 511 | 21.8 | 1.03E+00 | 30.0001 | 0.021 | 7.41E−04 | 11601.1 | 0.00E+00 | 7 | 212.376 |
| 230.20 | 1.97E+05 | 0.00121 | 0.00300 | 541 | 21.8 | 5.32E+00 | 30.0001 | 0.06057 | 0.00216 | 4482.39 | 0.00E+00 | 7 | 230.20 |
| 267.366 | 4825.01 | 0.0554 | 0.00440 | 572 | 21.8 | 0.20E+01 | 30.0001 | 0.02101 | 0.03764 | 207.677 | 0.00E+00 | 7 | 267.366 |
| 299.000 | 1019.57 | 0.29423 | 0.00503 | 602 | 21.8 | 8.84E+02 | 30.0001 | 0.00307 | 0.26874 | 45.21 | 0.00E+00 | 5 | 299.000 |
| 336.593 | 451.738 | 0.74511 | 0.00564 | 632 | 21.8 | 1.04E+03 | 30.0001 | 0.00274 | 0.74675 | 10.2706 | 0.00E+00 | 40 | 336.593 |
| 377.66 | 102.359 | 2.07007 | 0.00633 | 662 | 21.8 | 4.65E+03 | 30.0001 | 0.0070 | 1.88457 | 8.11608 | 0.00E+00 | 33 | 377.66 |

TABLE 2

RO 1 test 1

| Stress Pa | Eta Pa-s | Rate s-1 | Torque N-m | times | Temp °C. | Strain(t) % | SS Times |
|---|---|---|---|---|---|---|---|
| 29.9989 | 1.78E+05 | 1.60E−04 | 5.03E−04 | 0 | 21.8 | 2.28E−01 | 30.0001 |
| 33.8694 | DIV0 | 0 | 5.64E−04 | 29 | 21.8 | 0.00E+00 | 30.0001 |
| 37.7664 | DIV0 | 0 | 6.33E−04 | 69 | 21.8 | 0.00E+00 | 30.0001 |
| 42.3746 | DIV0 | 0 | 7.10E−04 | 90 | 21.8 | 0.00E+00 | 30.0001 |
| 47.5451 | 1.55E+06 | 3.07E−05 | 7.97E−04 | 120 | 21.8 | 7.24E−02 | 30.0001 |
| 53.3485 | 1.73E+06 | 3.00E−05 | 8.94E−04 | 150 | 21.8 | 7.24E−02 | 30.0001 |
| 59.8557 | 1.70E+06 | 3.63E−05 | 0.001 | 180 | 21.8 | 7.24E−02 | 30.0001 |
| 67.1592 | 1.66E+06 | 4.06E−05 | 0.00113 | 210 | 21.8 | 8.27E−02 | 30.0001 |
| 75.3539 | 1.18E+06 | 6.36E−05 | 0.00126 | 241 | 21.8 | 8.27E−02 | 30.0001 |
| 84.5485 | 1.23E+08 | 6.85E−05 | 0.00142 | 271 | 21.8 | 0.31E−02 | 30.0001 |
| 94.865 | 2.90E+06 | 3.27E−05 | 0.00169 | 301 | 21.8 | 1.24E−01 | 30.0001 |
| 106.44 | 1.82E+00 | 5.84E−05 | 0.00178 | 330 | 21.8 | 1.24E−01 | 30.0001 |
| 119.428 | 2.77E+06 | 4.30E−05 | 0.002 | 360 | 21.8 | 1.97E−01 | 30.0001 |
| 134 | 2.67E+06 | 5.02E−05 | 0.00225 | 391 | 21.8 | 2.40E−01 | 30.0001 |
| 150.351 | 2.54E+06 | 5.91E−05 | 0.00252 | 421 | 21.8 | 2.59E−01 | 30.0001 |
| 168.696 | 2.52E+06 | 6.70E−05 | 0.00283 | 451 | 21.8 | 3.62E−01 | 30.0001 |
| 189.28 | 2.49E+06 | 7.60E−05 | 0.00317 | 481 | 21.8 | 4.34E−01 | 30.0001 |
| 212.376 | 1.89E+06 | 1.12E−04 | 0.00356 | 511 | 21.8 | 5.90E−01 | 30.0001 |
| 238.29 | 1.29E+06 | 1.84E−04 | 0.00399 | 542 | 21.8 | 9.72E−01 | 30.0001 |
| 287.366 | 4.43E+05 | 6.03E−04 | 0.00448 | 572 | 21.8 | 2.93E+00 | 30.0001 |
| 299.989 | 9453.04 | 0.03173 | 0.00583 | 602 | 21.8 | 5.38E+01 | 30.0001 |
| 336.585 | 207.715 | 1.62042 | 0.00564 | 632 | 21.8 | 2.14E+03 | 30.0001 |

| SS Slope | theta rad | G' Pa | G" Pa | Position | stress(t) Pa |
|---|---|---|---|---|---|
| 0.32238 | 0.22E−05 | 13184.1 | 0.00E+00 | 1.06E−38 | 29.9989 |
| 0 | 0 | | 0.00E+00 | 1.05E−38 | 33.8694 |
| 0 | 0 | | 0.00E+00 | 1.06E−38 | 37.7664 |
| 0 | 0 | | 0.00E+00 | 1.06E−38 | 42.3746 |
| 0.03246 | 2.93E−05 | 65671.1 | 0.00E+00 | 1.06E−30 | 47.5461 |
| 0.03209 | 2.93E−05 | 73684.2 | 0.00E+00 | 1.06E−38 | 53.3485 |
| 0.03766 | 2.93E−05 | 82875 | 0.00E+00 | 1.06E−38 | 59.8557 |
| 0.03962 | 3.35E−05 | 81167.5 | 0.00E+00 | 1.06E−38 | 67.1502 |
| 0.06758 | 3.35E−05 | 91071.4 | 0.00E+00 | 1.06E−38 | 75.3539 |
| 0.06758 | 3.77E−05 | 90630.1 | 0.00E+00 | 1.06E−38 | 84.5485 |
| 0.08709 | 6.03E−05 | 76434.8 | 0.00E+00 | 1.06E−38 | 94.865 |
| 0.1288 | 5.03E−05 | 85761.2 | 0.00E+00 | 1.06E−38 | 106.44 |
| 0.01397 | 7.96E−05 | 60774.1 | 0.00E+00 | 1.06E−30 | 119.428 |
| 0.00372 | 1.01E−04 | 53983.5 | 0.00E+00 | 1.06E−38 | 134 |
| 0.01432 | 1.05E−04 | 68147.7 | 0.00E+00 | 1.06E−38 | 150.351 |
| 0.00961 | 1.47E−04 | 46602 | 0.00E+00 | 0 | 168.696 |
| 0.01458 | 1.76E−04 | 43573.6 | 0.00E+00 | 0 | 189.28 |
| 0.01287 | 2.39E−04 | 36024.6 | 0.00E+00 | 0 | 212.376 |
| 0.01100 | 3.94E−04 | 24510.1 | 0.00E+00 | 0 | 238.29 |
| 6.38E−07 | 0.00119 | 9134.52 | 0.00E+00 | 0 | 287.366 |
| 0.03555 | 0.02181 | 557.144 | 0.00E+00 | 0 | 299.989 |
| 0.02396 | 0.86562 | 15.7479 | 0.00E+00 | 0 | 336.585 |

TABLE 3

Tomato Triple Concentrate

| Stress Pa | Eta Pa-s | Rate s-1 | Torque N-m | times | Temp °C. | Strain(t) % | SS Times | SS Slope | theta rad | Position | N1 Pa | Normal-Force N |
|---|---|---|---|---|---|---|---|---|---|---|---|---|
| 4.99982 | DIV0 | 0.00E+00 | 8.38E−05 | 0 | 20 | 0.00E+00 | 30.0001 | 0 | 0 | 1 | 0 | 0 |
| 5.60989 | DIV0 | 0.00E+00 | 9.40E−05 | 29 | 20 | 0.00E+00 | 30.0001 | 0 | 0 | 1 | 0 | 0 |
| 6.2944 | DIV0 | 0.00E+00 | 1.05E−04 | 60 | 20 | 0.00E+00 | 30.0001 | 0 | 0 | 1 | 0 | 0 |
| 7.06244 | DIV0 | 0.00E+00 | 1.18E−04 | 90 | 20 | 0.00E+00 | 30.0001 | 0 | 0 | 1 | 0 | 0 |
| 7.92410 | DIV0 | 0.00E+00 | 1.33E−04 | 121 | 20 | 0.00E+00 | 30.0001 | 0 | 0 | 1 | 0 | 0 |
| 8.89108 | DIV0 | 0.00E+00 | 1.49E−04 | 151 | 20 | 0.00E+00 | 30.0001 | 0 | 0 | 1 | 0 | 0 |
| 9.97595 | DIV0 | 0.00E+00 | 1.67E−04 | 100 | 20 | 0.00E+00 | 30.0001 | 0 | 0 | 1 | 0 | 0 |
| 11.1932 | DIV0 | 0.00E+00 | 1.88E−04 | 211 | 20 | 0.00E+00 | 30.0001 | 0 | 0 | 1 | 0 | 0 |
| 12.550 | DIV0 | 0.00E+00 | 2.10E−04 | 241 | 20 | 0.00E+00 | 30.0001 | 0 | 0 | 1 | 0 | 0 |
| 14.0914 | DIV0 | 0.00E+00 | 2.36E−04 | 272 | 20 | 0.00E+00 | 30.0001 | 0 | 0 | 1 | 0 | 0 |
| 15.8108 | DIV0 | 0.00E+00 | 2.65E−04 | 302 | 20 | 0.00E+00 | 30.0001 | 0 | 0 | 1 | 0 | 0 |
| 17.74 | DIV0 | 0.00E+00 | 2.97E−04 | 331 | 20 | 0.00E+00 | 30.0001 | 0 | 0 | 1 | 0 | 0 |
| 19.9046 | DIV0 | 0.00E+00 | 3.34E−04 | 362 | 20 | 0.00E+00 | 30.0001 | 0 | 0 | 1 | 0 | 0 |
| 22.3334 | DIV0 | 0.00E+00 | 3.74E−04 | 392 | 20 | 0.00E+00 | 30.0001 | 0 | 0 | 1 | 0 | 0 |
| 25.0585 | DIV0 | 0.00E+00 | 4.20E−04 | 423 | 20 | 0.00E+00 | 30.0001 | 0 | 0 | 1 | 0 | 0 |

TABLE 3-continued

Tomato Triple Concentrate

| Stress Pa | Eta Pa-s | Rate s-1 | Torque N-m | times | Temp °C. | Strain(t) % | SS Times | SS Slope | theta rad | Position | N1 Pa | Normal-Force N |
|---|---|---|---|---|---|---|---|---|---|---|---|---|
| 28.1181 | DIV0 | 0.00E+00 | 4.71E−04 | 452 | 20 | 0.00E+00 | 30.0001 | 0 | 0 | 1 | 0 | 0 |
| 31.5467 | DIV0 | 0.00E+00 | 5.20E−04 | 402 | 20 | 0.00E+00 | 30.0001 | 0 | 0 | 1 | 0 | 0 |
| 35.396 | DIV0 | 0.00E+00 | 5.93E−04 | 513 | 20 | 0.00E+00 | 30.0001 | 0 | 0 | 1 | 0 | 0 |
| 39.716 | 9.81E+06 | 4.13E−05 | 6.65E−04 | 643 | 20 | 7.24E−02 | 30.0001 | 0.04596 | 2.03E−05 | 1 | 0 | 0 |
| 44.661 | 8.63E+05 | 6.16E−05 | 7.47−04 | 574 | 10.00 | 7.24E−02 | 30.0001 | 0.05922 | 2.93E−06 | 1 | 0 | 0 |
| 49.0982 | 7.72E+05 | 6.40E−05 | 8.38E−04 | 603 | 20 | 0.27E−02 | 30.0001 | 0.06921 | 3.35E−05 | 1 | 0 | 0 |
| 58.0989 | 1.53E+06 | 3.68E−05 | 9.40E−04 | 633 | 20 | 1.14E−01 | 30.0001 | 0.09517 | 4.61E−05 | 1 | 0 | 0 |
| 62.944 | 1.48E+08 | 4.25E−05 | 0.00105 | 664 | 20 | 1.24E−01 | 30.0001 | 0.10568 | 5.03E−05 | 1 | 0 | 0 |
| 70.6244 | 1.67E+08 | 4.22E−05 | 0.00118 | 604 | 20 | 1.55E−01 | 30.0001 | 0.01448 | 6.28E−05 | 1 | 0 | 0 |
| 79.2418 | 1.88E+06 | 4.21E−05 | 0.00133 | 725 | 20 | 2.07E−01 | 30.0001 | 0.01343 | 8.38E−05 | 1 | 0 | 0 |
| 88.9100 | 1.65E+08 | 5.38E−05 | 0.00149 | 754 | 20 | 2.38E−01 | 30.0001 | 0.0129 | 9.63E−05 | 1 | 0 | 0 |
| 09.7596 | 1.90E+08 | 5.25E−05 | 0.00167 | 784 | 20 | 2.90E−01 | 30.0001 | 0.01318 | 1.17E−04 | 1 | 0 | 0 |
| 111.932 | 1.61E+06 | 6.06E−05 | 0.00188 | 815 | 20 | 3.52E−01 | 30.0001 | 0.0119 | 1.42E−04 | 1 | 0 | 0 |
| 125.59 | 1.85E+06 | 7.60E−05 | 0.0021 | 845 | 20 | 4.65E−01 | 30.0001 | 0.01458 | 1.89E−04 | 1 | 0 | 0 |
| 140.914 | 1.54E+08 | 0.15E−05 | 0.00236 | 876 | 20 | 5.27E−01 | 30.0001 | 0.00889 | 2.14E−04 | 1 | 0 | 0 |
| 168.100 | 1.48E+00 | 1.00E−04 | 0.00265 | 005 | 20 | 0.41E−01 | 30.0001 | 0.00004 | 2.00E−04 | 1 | 0 | 0 |
| 177.4 | 1.27E+00 | 1.10E−04 | 0.00207 | 005 | 20 | 0.00E−01 | 30.0001 | 0.00074 | 3.62E−04 | 1 | 0 | 0 |
| 100.046 | 7.47E+05 | 2.67E−04 | 0.00334 | 000 | 20 | 1.20E+00 | 30.0001 | 0.01020 | 5.24E−04 | 1 | 0 | 0 |
| 223.334 | 60604.3 | 3.00E−03 | 0.00374 | 000 | 20 | 0.01E+00 | 30.0001 | 0.03402 | 0.00324 | 1 | 0 | 0 |
| 250.506 | 0002.61 | 3.00E−02 | 0.0042 | 1020 | 20 | 0.24E+01 | 30.0001 | 0.01100 | 0.03744 | 1 | 0 | 0 |
| 201.101 | 2621.00 | 1.07E−01 | 0.00471 | 1057 | 20 | 2.03E+02 | 30.0001 | 0.00241 | 0.11004 | 0 | 0 | 0 |
| 315.487 | 1270.03 | 2.47E−01 | 0.00520 | 1007 | 20 | 8.60E+02 | 30.0001 | 0.00284 | 0.26955 | 48 | 0 | 0 |
| 353.95 | 610.007 | 6.71E−01 | 0.00503 | 1116 | 20 | 1.40E+03 | 30.0001 | 0.0046 | 0.60012 | 43 | 0 | 0 |
| 307.140 | 337.724 | 1.18E+00 | 0.00665 | 1140 | 20 | 3.06E+03 | 30.0001 | 0.00624 | 1.24000 | 33 | 0 | 0 |
| 446.005 | 167.326 | 2.60E+00 | 0.00747 | 1177 | 20 | 0.24E+03 | 30.0001 | 0.0074 | 2.52782 | 12 | 0 | 0 |
| 400.384 | 1.01203 | 4.02E+02 | 0.00035 | 1207 | 20 | 5.00E+05 | 30.0001 | 0.01600 | 205.036 | 48 | 0 | 0 |

TABLE 4

DC test 1

| Stress Pa | Eta Pa-s | Rate s-1 | Torque N-m | times | Temp °C. | Strain(t) % | SS Times | SS Slope | theta rad | G' Pa | G" Pa | Position | stress(t) Pa |
|---|---|---|---|---|---|---|---|---|---|---|---|---|---|
| 40.9982 | 7.53E+05 | 6.64E−05 | 8.38E−04 | 0 | 21.8 | 8.40E−01 | 30.0001 | 0.0197 | 3.43E−04 | 5895.32 | 0.00E+00 | 2 | 49.9982 |
| 56.0989 | 1.09E+06 | 5.14E−05 | 8.40E−04 | 20 | 21.8 | 1.06E−01 | 30.0001 | 0.00955 | 7.54E−05 | 30133.4 | 0.00E+00 | 2 | 56.0989 |
| 62.944 | 1.10E+06 | 6.34E−05 | 0.00106 | 50 | 21.8 | 2.07E−01 | 30.0001 | 0.00917 | 8.38E−05 | 30429.2 | 0.00E+00 | 2 | 62.944 |
| 70.6244 | 8.40E+05 | 8.33E−05 | 0.00118 | 90 | 21.8 | 2.38E−01 | 30.0001 | 0.06719 | 9.63E−05 | 29688.8 | 0.00E+00 | 2 | 70.6244 |
| 79.2418 | 1.33E+06 | 5.94E−05 | 0.00133 | 120 | 21.8 | 2.38E−01 | 30.0001 | 0.0172 | 9.63E−05 | 33311.4 | 0.00E+00 | 2 | 79.2418 |
| 88.9108 | 1.32E+06 | 6.75E−05 | 0.00149 | 150 | 21.8 | 3.00E−01 | 30.0001 | 0.00631 | 1.21E−04 | 29643.1 | 0.00E+00 | 2 | 86.9108 |
| 99.7596 | 1.18E+06 | 8.48E−05 | 0.00167 | 100 | 21.8 | 4.03E−01 | 30.0001 | 0.00977 | 1.63E−04 | 24731.8 | 0.00E+00 | 2 | 88.7596 |
| 111.932 | 9.06E+05 | 1.24E−04 | 0.00188 | 210 | 21.8 | 5.07E−01 | 30.0001 | 0.01481 | 2.05E−04 | 22086.4 | 0.00E+00 | 2 | 111.932 |
| 125.59 | 0.20E+05 | 1.35E−04 | 0.0021 | 241 | 21.8 | 7.24E−01 | 30.0001 | 0.0081 | 2.03E−04 | 17346.9 | 0.00E+00 | 2 | 125.59 |
| 140.914 | 6.45E+05 | 2.69E−04 | 0.00236 | 271 | 21.8 | 1.15E+00 | 30.0001 | 0.0408 | 4.85E−04 | 12274.3 | 0.00E+00 | 2 | 140.914 |
| 158.108 | 2.80E+05 | 6.86E−04 | 0.00285 | 301 | 21.8 | 2.40E+00 | 30.0001 | 0.06567 | 9.72E−04 | 6589.2 | 0.00E+00 | 2 | 158.108 |
| 177.4 | 50308.2 | 0.00304 | 0.00207 | 331 | 21.8 | 8.89E+00 | 30.0001 | 0.02847 | 0.0036 | 1994.45 | 0.00E+00 | 2 | 177.4 |
| 199.046 | 6004.7 | 0.03907 | 0.00334 | 360 | 21.8 | 7.95E+01 | 30.0001 | 0.01121 | 0.03222 | 250.229 | 0.00E+00 | 1 | 199.046 |
| 223.334 | 1455.9 | 0.1534 | 0.00374 | 391 | 21.8 | 3.72E+02 | 30.0001 | 0.00304 | 0.15084 | 58.965 | 0.00E+00 | 0 | 223.334 |
| 250.585 | 711.047 | 0.36202 | 0.0042 | 421 | 21.8 | 9.31E+02 | 30.0001 | 0.00166 | 0.37721 | 26.9047 | 0.00E+00 | 47 | 250.686 |
| 201.16 | 378.474 | 0.74288 | 0.00471 | 451 | 21.8 | 1.09E+03 | 30.0001 | 0.00622 | 0.76650 | 14.8541 | 0.00E+00 | 41 | 201.16 |
| 315.463 | 166.641 | 1.89307 | 0.00520 | 481 | 21.8 | 4.52E+03 | 30.0001 | 0.01050 | 1.8305 | 6.97965 | 0.00E+00 | 26 | 316.463 |
| 336.064 | 0.87151 | 305.61 | 0.00583 | 511 | 21.8 | 9.24E+04 | 30.0001 | 0.22919 | 37.4415 | 0.36352 | 0.00E+00 | 38 | 336.064 |

TABLE 5

C test 1

| Stress Pa | Eta Pa-s | Rate s-1 | Torque N-m | times | Temp °C. | Strain(t) % | SS Times |
|---|---|---|---|---|---|---|---|
| 9.99964 | 1.70E+05 | 5.58E−05 | 1.88E−04 | 0 | 21.8 | 6.62E−01 | 30.0001 |
| 11.2198 | 3.38E+05 | 3.32E−05 | 1.88E−04 | 30 | 21.8 | 1.14E−01 | 30.0001 |
| 12.5888 | 1.29E+05 | 9.76E−05 | 2.11E−04 | 60 | 21.8 | 1.55E−01 | 30.0001 |
| 14.1249 | 3.64E+05 | 3.99E−05 | 2.37E−04 | 91 | 21.8 | 1.24E−01 | 30.0001 |
| 15.8404 | 4.36E+05 | 3.63E−05 | 2.88E−04 | 121 | 21.8 | 1.55E−01 | 30.0001 |
| 17.7822 | 2.6E+05 | 8.02E−05 | 2.08E−04 | 151 | 21.8 | 1.76E−01 | 30.0001 |
| 19.9519 | 3.52E+05 | 5.67E−05 | 3.34E−04 | 181 | 21.8 | 2.07E−01 | 30.0001 |
| 22.3864 | 3.66E+05 | 8.12E−05 | 3.75E−04 | 211 | 21.8 | 3.21E−01 | 30.0001 |
| 25.118 | 2.41E+05 | 1.04E−04 | 4.21E−04 | 241 | 21.8 | 5.07E−01 | 30.0001 |

TABLE 5-continued

C test 1

| | | | | | | | |
|---|---|---|---|---|---|---|---|
| 28.1828 | 59885 | 4.71E−04 | 4.72E−04 | 271 | 21.8 | 2.20E+00 | 30.0001 |
| 31.8217 | 28718.5 | 0.00118 | 5.30E−04 | 301 | 21.8 | 4.78E+00 | 30.0001 |
| 35.4802 | 1395.92 | 0.02542 | 5.94E−04 | 331 | 21.8 | 5.19E+01 | 30.0001 |
| 30.8091 | 333.057 | 0.11953 | 6.67E−04 | 361 | 21.8 | 2.98E+02 | 30.0001 |
| 44.6664 | 136.674 | 0.32681 | 7.48E−04 | 392 | 21.8 | 8.57E+02 | 30.0001 |
| 50.1159 | 68.4758 | 0.73188 | 8.40E−04 | 422 | 21.8 | 1.91E+03 | 30.0001 |
| 66.2312 | 36.277 | 1.55005 | 9.42E−04 | 452 | 21.8 | 3.94E+03 | 30.0001 |
| 63.0004 | 19.9316 | 3.16534 | 0.00108 | 482 | 21.8 | 7.90E+03 | 30.0001 |
| 70.7506 | 7.84429 | 0.02051 | 0.00119 | 512 | 21.8 | 1.99E+04 | 30.0001 |
| 70.3276 | 2.13192 | 37.2094 | 0.00133 | 543 | 21.8 | 7.17E+04 | 30.0001 |
| 89.2037 | 1.09677 | 81.3328 | 0.00149 | 573 | 21.8 | 2.22E+05 | 30.0001 |
| 100.243 | 0.89726 | 143.787 | 0.00168 | 602 | 21.8 | 4.08E+05 | 30.0001 |
| 112.38 | 0.4534 | 247.881 | 0.00188 | 632 | 21.8 | 6.70E+05 | 30.0001 |
| 126.18 | 0.33558 | 378.004 | 0.00211 | 663 | 21.8 | 1.07E+06 | 30.0001 |
| 141.308 | 0.2491 | 667.283 | 0.00237 | 693 | 21.8 | 1.65E+06 | 30.0001 |
| 158.346 | 0.19264 | 821.993 | 0.00265 | 723 | 21.8 | 2.35E+06 | 30.0001 |
| 177.42 | 0.16473 | 1077.01 | 0.00207 | 754 | 21.8 | 3.19E+06 | 30.0001 |
| 199.079 | 0.1382 | 1440.49 | 0.00334 | 784 | 21.8 | 4.11E+06 | 30.0001 |
| 223.337 | 0.11941 | 1870.29 | 0.00374 | 814 | 21.8 | 5.28E+06 | 30.0001 |
| 251.339 | 0.11326 | 2219.04 | 0.00421 | 845 | 21.8 | 6.74E+06 | 30.0001 |
| 282.139 | 0.10672 | 2643.73 | 0.00473 | 875 | 21.8 | 7.78E+06 | 30.0001 |
| 315.874 | 0.09466 | 3320.83 | 0.00529 | 905 | 21.8 | 9.48E+06 | 30.0001 |

| SS Slope | theta rad | G' Pa | G" Pa | Position | stress(t) Pa |
|---|---|---|---|---|---|
| 0.02358 | 2.68E−04 | 1510.67 | 0.00E+00 | 28 | 9.99964 |
| 0.07678 | 4.61E−05 | 9861.85 | 0.00E+00 | 28 | 11.2198 |
| 0.0804 | 6.28E−05 | 8114.46 | 0.00E+00 | 28 | 12.5888 |
| 0.11779 | 5.03E−05 | 11380.7 | 0.00E+00 | 28 | 14.1249 |
| 0.01298 | 6.28E−05 | 10215.5 | 0.00E+00 | 28 | 15.8484 |
| 0.0277 | 7.12E−05 | 10113.5 | 0.00E+00 | 28 | 17.7822 |
| 0.02612 | 8.38E−05 | 9645.41 | 0.00E+00 | 28 | 19.9510 |
| 0.00972 | 1.30E−04 | 6982.15 | 0.00E+00 | 28 | 22.3864 |
| 0.00409 | 2.05E−04 | 4956.27 | 0.00E+00 | 28 | 25.118 |
| 0.11241 | 8.92E−04 | 1279.3 | 0.00E+00 | 28 | 28.1828 |
| 0.03648 | 0.00194 | 661.773 | 0.00E+00 | 28 | 31.6217 |
| 0.01768 | 0.02104 | 68.3086 | 0.00E+00 | 28 | 35.4802 |
| 0.00875 | 0.12062 | 13.366 | 0.00E+00 | 27 | 39.8091 |
| 0.00489 | 0.34692 | 5.21437 | 0.00E+00 | 24 | 44.6664 |
| 0.00837 | 0.77453 | 2.62055 | 0.00E+00 | 10 | 50.1159 |
| 0.00335 | 1.59554 | 1.42733 | 0.00E+00 | 5 | 56.2312 |
| 0.00403 | 3.23394 | 0.79011 | 0.00E+00 | 28 | 63.0904 |
| 0.01829 | 8.04345 | 0.35629 | 0.00E+00 | 12 | 70.7595 |
| 0.01495 | 20.0404 | 0.11063 | 0.00E+00 | 21 | 79.3276 |
| 0.01263 | 90.0674 | 0.04011 | 0.00E+00 | 31 | 89.2037 |
| 0.01538 | 165.166 | 0.02458 | 0.00E+00 | 26 | 100.243 |
| 0.00514 | 271.461 | 0.01677 | 0.00E+00 | 47 | 112.38 |
| 0.00542 | 433.814 | 0.01176 | 0.00E+00 | 33 | 126.18 |
| 0.00337 | 669.478 | 0.00855 | 0.00E+00 | 31 | 141.308 |
| 0.0017 | 953.198 | 0.00873 | 0.00E+00 | 38 | 158.346 |
| 0.00260 | 1293.01 | 0.00556 | 0.00E+00 | 4 | 177.42 |
| 0.00196 | 1664.01 | 0.00485 | 0.00E+00 | 3 | 199.079 |
| 0.00135 | 2138.97 | 0.00423 | 0.00E+00 | 29 | 223.337 |
| 3.04E−04 | 2720.09 | 0.00373 | 0.00E+00 | 34 | 251.339 |
| 5.49E−04 | 3152.8 | 0.00362 | 0.00E+00 | 31 | 282.139 |
| 5.93E−04 | 3840.24 | 0.00333 | 0.00E+00 | 45 | 315.874 |

TABLE 6

| Stress Pa | Eta Pa-s | Rate s-1 | Torque N-m | times | Temp °C. | Strain(I) % | SS Times | SS Slope | Theta rad | Position | Nf Pa | Normal-Force N |
|---|---|---|---|---|---|---|---|---|---|---|---|---|
| 0.5600 | 34728.3 | 6.385E−06 | 7.05E−06 | 30 | 20 | 0.0066007 | 30 | 0.01035 | 2.78263E−00 | 31 | 0 | 0 |
| 0.62044 | #DIV/01 | 0 | 7.01E−06 | 50 | 20 | 0 | 30 | 0 | 0 | 31 | 0 | 0 |
| 0.70624 | 27410.7 | 8.588E−06 | 8.875E−06 | 90 | 20 | 0.0027953 | 30 | 0.0148433 | 1.39827E−08 | 31 | 0 | 0 |
| 0.7024387 | 21680.36 | 3.423E−06 | 0.058E−06 | 121 | 20 | 0.0279057 | 30 | 0.00843 | 1.30627E−05 | 31 | 0 | 0 |
| 0.8001087 | 19586.36 | 3.070E−06 | 1.117E−05 | 181 | 20 | 0.0111757 | 30 | 0.1018433 | 5.58507E−08 | 31 | 0 | 0 |
| 0.0078 | #DIV/01 | 0 | 1.254E−05 | 181 | 20 | 0 | 30 | 0 | 0 | 31 | 0 | 0 |
| 1.11932 | #DIV/01 | 0 | 1.407E−05 | 211 | 20 | 0 | 30 | 0 | 0 | 31 | 0 | 0 |
| 1.2556033 | 6142.9 | 0.010E−06 | 1.678E−05 | 241 | 20 | 0.0139027 | 30 | 0.0882833 | 0.08133E−08 | 31 | 0 | 0 |
| 1.40914 | 28574.8 | 1.044E−06 | 1.771E−05 | 271 | 20 | 0.011160 | 30 | 0.0193433 | 0.000005885 | 31 | 0 | 0 |
| 1.58100 | #DIV/01 | 0 | 1.887E−05 | 302 | 20 | 0 | 30 | 0 | 0 | 31 | 0 | 0 |
| 1.774 | #DIV/01 | 0 | 2.229E−05 | 332 | 20 | 0 | 30 | 0 | 0 | 31 | 0 | 0 |

TABLE 6-continued

| Stress Pa | Eta Pa-s | Rate s-1 | Torque N-m | Temp times | °C. | Strain(I) % | SS Times | SS Slope | Theta rad | Position | Nf Pa | Normal-Force N |
|---|---|---|---|---|---|---|---|---|---|---|---|---|
| 1.990107 | 14785 | 4.487E−05 | 2.501E−05 | 302 | 20 | 0.04103 | 30 | 0.0808307 | 0.000020914 | 31 | 0 | 0 |
| 2.23334 | 00285.6 | 1.871E−05 | 2.807E−05 | 302 | 20 | 0.0343223 | 30 | 0.0232887 | 1.81517E−06 | 31 | 0 | 0 |
| 2.60565 | 07016.3 | 2.050E−05 | 2.140E−05 | 423 | 20 | 0.058843 | 30 | 0.0381333 | 0.000029322 | 31 | 0 | 0 |
| 2.81181 | 08003.2 | 4.200E−05 | 3.033E−05 | 453 | 20 | 0.087021 | 30 | 0.0512333 | 0.00003351 | 31 | 0 | 0 |
| 3.15487 | 87012.787 | 3.776E−06 | 3.084E−05 | 483 | 20 | 0.083770 | 30 | 0.08328 | 0.000041665 | 31 | 0 | 0 |
| 3.6300 | 121013.33 | 2.881E−06 | 4.448E−05 | 513 | 20 | 0.1117133 | 30 | 0.00138 | 5.58603E−05 | 31 | 0 | 0 |
| 3.0715 | 08550.1 | 6.714E−05 | 4.001E−05 | 543 | 20 | 0.1308333 | 30 | 0.04377 | 0.000088117 | 31 | 0 | 0 |
| 4.4680987 | 101738.83 | 4.020E−05 | 6.0E−05 | 573 | 20 | 0.1703687 | 30 | 0.02501 | 5.51717E−05 | 31 | 0 | 0 |
| 4.00982 | 00107.133 | 5.130E−05 | 0.283E−05 | 604 | 20 | 0.2178287 | 30 | 0.0086167 | 0.00010891 | 31 | 0 | 0 |
| 5.00000 | 11165.067 | 5.056E−05 | 7.05E−05 | 634 | 20 | 0.28205 | 30 | 0.0148370 | 0.000141023 | 31 | 0 | 0 |
| 8.2044 | 81487.087 | 0.001240 | 7.91E−05 | 601 | 20 | 0.4210833 | 30 | 0.0127067 | 0.000210037 | 31 | 0 | 0 |
| 7.00244 | 57415.233 | 0.0002346 | 8.876E−05 | 604 | 20 | 0.7511367 | 30 | 0.0385933 | 0.000376607 | 31 | 0 | 0 |
| 7.02418 | 34778.807 | 0.0002348 | 9.958E−05 | 725 | 20 | 1.0000987 | 30 | 0.0291187 | 0.000504053 | 31 | 0 | 0 |
| 0.0910833 | 21250.2 | 0.0004212 | 0.0001117 | 765 | 20 | 1.7000333 | 30 | 0.0453247 | 0.000805003 | 31 | 0 | 0 |
| 0.0700233 | 12228.87 | 0.000800 | 0.0001254 | 706 | 20 | 3.0030007 | 30 | 0.2000387 | 0.001053339 | 31 | 0 | 0 |
| 11.193233 | 5387.07 | 0.0021313 | 0.0001407 | 816 | 20 | 0.6060333 | 30 | 0.1100007 | 0.0045 | 31 | 0 | 0 |
| 12.558887 | 500.45287 | 0.0288107 | 0.0001578 | 815 | 20 | 81.335333 | 30 | 0.0287367 | 0.030873333 | 31 | 0 | 0 |
| 14.001233 | 111.00037 | 0.1200233 | 0.0001771 | 875 | 20 | 316.80333 | 30 | 0.0083167 | 0.107883333 | 30 | 0 | 0 |
| 15.010587 | 60.501287 | 0.2804033 | 0.0001087 | 806 | 20 | 707.70 | 30 | 0.0000287 | 0.3830 | 43 | 0 | 0 |
| 17.7307 | 55.610233 | 0.5004387 | 0.0001029 | 930 | 20 | 1404.8 | 30 | 0.0043007 | 0.70240007 | 37 | 0 | 0 |
| 19.004 | 24.294033 | 0.82184 | 0.0002501 | 066 | 20 | 2317.7883 | 30 | 0.00374 | 1.168883333 | 28 | 0 | 0 |
| 22.3332 | 17.133133 | 1.3038333 | 0.0002506 | 096 | 20 | 3609.0333 | 30 | 0.0040233 | 1.84951 | 13 | 0 | 0 |
| 26.067667 | 12.1413 | 2.0005 | 0.00031411 | 1027 | 20 | 6830.7333 | 30 | 0.0032907 | 2.91408667 | 39 | 0 | 0 |
| 20.136 | 5.8615333 | 3.1706 | 0.0003633 | 1057 | 20 | 9000.0 | 30 | 0.0008333 | 4.50031 | 19 | 0 | 0 |
| 31.6400 | 0.6317407 | 4.8812333 | 0.000004 | 1057 | 20 | 13010 | 30 | 0.00183 | 0.96407 | 28 | 0 | 0 |
| 36.303 | 4.7710233 | 7.1010007 | 0.0004440 | 1116 | 20 | 21332 | 30 | 0.0020687 | 10.00600807 | 24 | 0 | 0 |
| 80.7122 | 3.2612267 | 12.10700 | 0.000400 | 1116 | 20 | 34330.333 | 30 | 0.00643 | 17.100 | 33 | 0 | 0 |
| 11.630007 | 1.06270093 | 23.437333 | 0.0005500 | 1177 | 20 | 80407 | 30 | 0.01064 | 30.24520807 | 18 | 0 | 0 |

TABLE 7

Test of the saucing power and organoleptic properties on the invention products Ro1 and Ro2 and on commercial tomato products: triple concentrate, double concentrate, concentrate and tomato passatas.

| Product | Condiment attached to the pasta (g) | Saucing power | Organoleptic properties (taste, smell) |
|---|---|---|---|
| Ro2 (Ex. 1) | 88.0 | 8.8 | delicate taste of fresh tomato, fresh tomato smell |
| Ro1 (Ex. 2) | 97.8 | 9.8 | very good taste and fresh tomato smell |
| triple concentrate (TC) | 70.0 | 7 | caramel, bitter taste, the tomato is not recognized; cooking ("cotto") smell |
| double concentrate (DC) | 65.0 | 6.5 | caramel taste, the tomato is not recognized; cooking ("cotto") smell. |
| concentrate (C) | 62.0 | 6.2 | very sweet taste, the tomato is not recognized; tomato smell |
| tomato passatas | 40.0 | 4 | boiled pasta taste, very light tomato smell |

The invention claimed is:

1. A tomato composition obtained from tomato juice or tomato passatas having the following composition in percentage by weight:

| dry residue | 5.5-20%, |
| water | 94.5-80%, |

100% being the sum of the two components,
wherein said dry residue comprises water-insoluble tomato solids and water-soluble tomato solids, wherein the amount of water-insoluble tomato solids and water-soluble tomato solids in the dry residue ranges in percentage by weight as follows based on the total weight of the dry residue:
water-insoluble tomato solids from 18% to 30%,
water-soluble tomato solids from 82% to 70%.

2. A tomato composition according to claim 1, wherein the amount of water-insoluble solids and water-soluble solids in the dry residue ranges in percentage by weight as follows:
water-insoluble solids from 20% to 0.30%,
water-soluble solids from 80% to 70%.

3. A composition comprising animal and/or vegetable fats mechanically admixed with a tomato composition obtained from tomato juice or tomato passatas having the following composition in percentage by weight:
dry residue 5.5-20%,
water 94.5-80%,
100% being the sum of the two components,
wherein said dry residue comprises water-insoluble tomato solids and water-soluble tomato solids, wherein the amount of water-insoluble tomato solids and water-soluble tomato solids in the dry residue ranges in percentage by weight as follows, based on the total weight of the dry residue:
water-insoluble tomato solids from 18% to 30%.
water-soluble tomato solids from 82% to 70%.

4. A composition according to claim 3, wherein said animal and/or vegetable fats are solid at room temperature.

5. A composition according to claim 3, wherein said animal and/or vegetable fats are liquid at room temperature.

6. A composition according to claim 4, wherein said animal and/or vegetable fats comprise butter or margarine.

7. A composition according to claim 5, wherein said animal and/or vegetable fats comprise olive oil.

8. A composition according to claim 3, wherein said animal and/or vegetable fats comprise soft, hard or grated cheese.

9. A tomato composition according to claim 3, wherein the composition contains said fats, based upon the weight of the tomato composition, in an amount ranging from 10% to 25% by weight.

10. A method of saucing food which comprises mixing with food a tomato composition obtained from tomato juice or tomato passatas having the following composition in percentage by weight:

dry residue 5.5-20%,
water 94.5-80%,
100% being the sum of the two components
wherein said dry residue comprises water-insoluble tomato solids and water-soluble tomato solids, wherein the amount of water-insoluble tomato solids and water-soluble tomato solids in the dry residue ranges in percentage by weight as follows, based on the total weight of the dry residue:
water-insoluble tomato solids from 18% to 30%,
water-soluble tomato solids from 82% to 70%.

11. The method of claim 10, wherein said food is pasta, meat, fish or vegetables.

12. A ready-to-use sauce for food comprising a tomato composition obtained from tomato juice or tomato passatas having the following composition in percentage by weight:
dry residue 5.5-20%,
water 94.5-80%,
100% being the sum of the two components,
wherein said dry residue comprises water-insoluble tomato solids and water-soluble tomato solids, wherein the amount of water-insoluble tomato solids and water-soluble tomato solids in the dry residue ranges in percentage by weight as follows, based on the total weight of the dry residue:
water-insoluble tomato solids from 18% to 30%,
water-soluble tomato solids from 82% to 70%.

13. A ready-to-use sauce for food according to claim 12, further comprising animal and/or vegetable fats mechanically admixed with the tomato composition.

14. A composition comprising an essence aroma and/or preservative for food and the composition of claim 1.

15. A composition comprising an essence aroma and/or preservative for food and the composition of claim 3.

16. Food comprising the tomato composition of claim 1.

17. Food comprising the composition of claim 3.

18. A tomato product prepared by a process comprising separating by filtration tomato serum from water insoluble solids present in either tomato juice or in tomato passatas using a separation solid-liquid apparatus at a temperature of from 5° C. to 25° C. wherein said tomato juice or tomato passatas is maintained under stirring with a stirrer at an angular speed from 1 rpm to 20 rpm during filtration, the stirrer being of a shape to convey the tomato juice or tomato passatas toward the central axis of the apparatus, and recovering said tomato serum and/or said water insoluble solids as said tomato product, wherein the tomato product has the following composition in percentage by weight:
dry residue 5.5-20%,
water 94.5-80%
100% being the sum of the two components
wherein said dry residue comprises water-insoluble tomato solids and water-soluble tomato solids, wherein the amount of water-insoluble tomato solids and water-soluble tomato solids in the dry residue ranges in percentage by weight as follows, based on the total weight of the dry residue:
water-insoluble tomato solids from 18% to 30%,
water-soluble tomato solids from 82% to 70%.

19. A tomato product prepared according to the process of claim 18, wherein the apparatus for separating the liquid from said tomato juice or tomato passatas is a sieve maintained under an oscillating motion, the oscillations being from 1 to 20 oscillations/min.

20. A tomato product prepared according to the process of claim 18, wherein sterile conditions are used or the final tomato product undergoes a sterilization process.

21. A tomato product prepared according to the process of claim 18, wherein the process is conducted at temperatures in the range of 10° C.-15° C., at atmospheric pressure, or at pressures slightly higher than atmospheric pressure, from 760 mm Hg (0.101 MPa) up to 900 mm Hg (0.120 MPa) or by applying pressures slightly lower than atmospheric pressure, down to 450 mm Hg (0.06 MPa).

22. A tomato product prepared according to the process of claim 18, wherein a separation solid-liquid apparatus constituted of a vessel having walls with slots or with holes is employed, wherein the width of the slots or the diameter of the holes is not greater than 0.1 mm, the slot length ranging from 30 cm to 2 meters, said vessel having a cylindrical section, the separator being equipped with a mechanical stirrer, wherein the distance between the separator walls and the stirrer blades is from 0.5 to 2 cm.

23. A tomato product prepared according to the process of claim 19, wherein a concave- or flat-shaped sieve, having hole diameters or slot widths not greater than 0.1 mm is operated at atmospheric pressure.

24. A tomato product prepared according to the process of claim 18, wherein the equipment employed comprises a cylinder constituted by food grade stainless steel wherein the walls have openings or slots formed by woven wire cloth, or by screens, or said walls have holes, being the width of the openings of the slots, or hole diameters not greater than 0.1 mm, said cylinder having an inner stirrer in the form of an archimedean screw revolving free in the fixed cylinder, or the cylinder is a rotating tube wound helically about a cylindrical axis.

25. A tomato product prepared according to the process of claim 18, wherein the rotation of the stirrer is at an angular speed of 2-10 rpm.

26. A tomato product prepared according to the process of claim 24, wherein the cylinder is in a horizontal position, and has a diameter ranging from 30 cm to 1 meter or a length from 2 meters to 20 meters for apparatus working in a discontinuous way or about 20 meters for apparatus which works in a continuous way.

27. A tomato product prepared according to the process of claim 18, wherein the separation solid-liquid apparatus is provided with slots having a width or holes having a diameter not higher than 0.5 mm.

28. A tomato product prepared according to the process of claim 18, wherein a tomato composition having a content of water-insoluble solids in the range from 20% to 30% based on dry residue is added to either lyophilized or cryoconcentrated serum, or a serum concentrated by an osmosis membrane or by evaporation under vacuum.

29. A tomato composition according to claim 1 or 2 wherein said composition is obtained from tomato juice.

30. A tomato composition according to claim 1 or 2 wherein said composition is obtained from tomato passatas.

31. A tomato product prepared according to the process of claim 18, wherein said water insoluble solids are present in tomato juice.

32. A tomato product prepared according to the process of claim 18, wherein said water insoluble solids are present in tomato passatas.

33. A composition according to claim 8, wherein said cheese is hard cheese and/or grated cheese present in an amount of from 10% to 25% by weight, based on the weight of the tomato composition.

34. A composition according to claim 8, wherein said cheese is soft cheese present in an amount of from 50% to 300% by weight, based on the weight of the tomato composition.

* * * * *

UNITED STATES PATENT AND TRADEMARK OFFICE
CERTIFICATE OF CORRECTION

PATENT NO. : 7,635,496 B2 Page 1 of 1
APPLICATION NO. : 10/524014
DATED : December 22, 2009
INVENTOR(S) : Aurelio Romeo It is certified that error appears in the above-identified patent and that said Letters Patent is hereby corrected as shown below:

On the Title Page In Assignee's Name:

Item (73) Assignee: should read, -- Zanichelli Richerche S.R.L., Rome (IT) --.

In Column 9, line 43:

"Kg" should read -- 10Kg --.

In Column 20, line 34:

"0.30%" should read -- 30% --.

Signed and Sealed this

Eighteenth Day of May, 2010

David J. Kappos
*Director of the United States Patent and Trademark Office*